United States Patent [19]

Moore et al.

[11] Patent Number: 4,863,802

[45] Date of Patent: Sep. 5, 1989

[54] UV-STABILIZED COATINGS

[75] Inventors: James E. Moore, Mt. Vernon, Ind.; Arnold Factor; Peter M. Miranda, both of Scotia, N.Y.

[73] Assignee: General Electric Company, Pittsfield, Mass.

[21] Appl. No.: 140,105

[22] Filed: Dec. 31, 1987

[51] Int. Cl.$^4$ .................. B05D 5/00; B32B 27/36
[52] U.S. Cl. .................... 428/412; 424/59; 427/54.1; 427/160; 427/377; 427/393.5; 428/500; 548/257; 548/256; 548/261
[58] Field of Search ............ 427/160, 54.1, 393.5, 427/377; 548/261, 257, 259; 424/59; 428/412, 500

[56] References Cited

U.S. PATENT DOCUMENTS

| | | | |
|---|---|---|---|
| 4,146,658 | 3/1979 | Humphrey | 427/160 |
| 4,198,465 | 3/1980 | Moore et al. | 428/409 |
| 4,208,465 | 6/1980 | Chung | 427/160 |
| 4,210,699 | 7/1980 | Schroeter et al. | 427/160 |

FOREIGN PATENT DOCUMENTS 1197246  1/1982  Canada .................. 249/20

Primary Examiner—Janyce Bell
Attorney, Agent, or Firm—Spencer D. Conard

[57] ABSTRACT

Novel coating compositions contain a radiation polymerizable acrylic monomer or oligomer and an ultraviolight-light absorbing effective amount of a UV-absorbing multimeric benzotriazole compound.

22 Claims, No Drawings

UV-STABILIZED COATINGS

BACKGROUND OF THE INVENTION

This invention relates to UV radiation protective coatings comprised of acrylic monomers or oligomers or mixtures thereof and an ultraviolet radiation absorber and thermoplastic articles coated with such coating.

Thermoplastics, such as polycarbonates, polyesters, polyvinyls, and the like are commercially important materials which are useful in a wide range of applications, from non-opaque impact resistant sheets to shaped articles. Many of these materials have rather low scratch resistance, are susceptible to attack by many common solvents and chemicals, and are subject to microcracking with aging and exposure, particularly exposure to ultraviolet light.

One process that has been used to overcome low scratch resistance and susceptibility to attack by solvents is the application of a durable coating to the plastic substrate. Typically, these coatings have been UV-curable, acrylate-based coatings. Moore, et al., U.S. Pat. No. 4,198,465, describe a polycarbonate article coated with a durably adherent mar, abrasion and chemical resistant UV cured coating. The coating is comprised of the photoreaction products of polyfunctional acrylate monomers and resorcinol monobenzoate. For some applications such as outdoor signs and the like, the UV absorber used in this coating, resorcinol monobenzoate, does not provide adequate protection of the polycarbonate substrate.

A need exists for UV-stabilized coating compositions which retain the advantageous physical and chemical properties of the base coating composition, and which retain their UV-absorbing characteristics at elevated temperatures.

SUMMARY OF THE INVENTION

In accordance with the present invention, novel coating compositions contain a radiation polymerizable acrylic monomer or oligomer and an ultraviolet light-absorbing effective amount of a UV-absorbing multimeric benzotriazole compound.

In a further embodiment of the invention, there is provided an article having ultraviolet radiation degradation resistance comprising a thermoplastic substrate coated with an ultraviolet radiation-stabilizing coating composition containing a radiation polymerizable acrylic monomer or oligomer and an ultraviolet light-absorbing effective amount of a UV-absorbing multimeric benzotriazole compound.

In a preferred embodiment of the invention, the coating compositions are UV-curable, acrylate based coatings which contain an ultraviolet light-absorbing effective amount of UV-absorbing dimeric benzotriazole compound.

DETAILED DESCRIPTION OF THE INVENTION

The benzotriazole compounds employed in the composition of this invention are represented by the general formula:

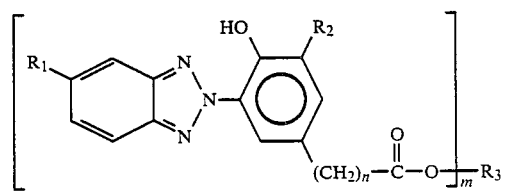

wherein $R_1$ is hydrogen, a halogen, a lower alkyl of from 1 to about 6 carbon atoms or a lower alkoxy of from 1 to about 6 carbon atoms. $R_2$ is hydrogen, halogen, lower alkyl of from 1 to about 6 carbon atoms, or an arylsulfonyl, wherein the aryl group contains from 6 to about 10 carbon atoms; n is an integer from 1 to about 4, m is 2 or 3 and $R_3$ is a divalent or trivalent hydrocarbon radical or lower alkyl ether radical of from 2 to about 22 carbon atoms. In preferred compounds $R_2$ is hydrogen or a lower branched alkyl group of from 3 to about 6 carbon atoms.

Preferably the compound is a benzotriazole dimer where $R_3$ is $-CH_2CH_2-(-OCH_2CH_2-)_y$ or $-(CH_2)_6$, wherein y is an integer from about 2 to about 4; and m is 2. These compounds have the special attributes of low volatility and high UV light absorptivity. The multimeric benzotriazole compounds have been found to be very compatible with the coating compositions described herein. Incorporation of a UV-absorbing effective amount of the multimeric benzotriazole compound does not to significantly interfere with the properties of the coating. For example, when these compounds are used in UV curable coatings designed to impart scratch and abrasion resistance, the coatings show very good UV absorptivity, Taber abrasion resistance, and cross-hatched adhesion.

The coatings of this invention contain an ultraviolet radiation-absorbing effective amount of the multimeric benzotriazole. Such an amount is generally effective to protect the thermoplastic substrate from the degradative effects of ultraviolet radiation. Typically, the concentration of the benzotriazole compound is sufficient to provide a coating layer absorbance greater than about 2.0, preferably greater than about 2.5 at the wavelength of maximum UV absorbance.

The UV stabilized coating of the present invention may be applied to a variety thermoplastic articles and sheets. Suitable thermoplastics include: polycarbonates, acrylic and methacrylic polymers or copolymers; acetal homopolymers; acetal copolymers produced by polymerization of trioxane and ethylene oxide, epoxy resins; phenylene oxide-based resins such as polyphenylene oxide and blends of polyphenylene oxide and styrene resins; polyalkyl ethers; polyesters; polyethylene; polyphenylene sulfides; polypropylene; polysulfones; ethylene polymers such as ethyl vinyl acetates; and necessary compatabilizers. The preferred thermoplastic substrate for use with the protective coating described herein is a polycarbonate sheet or film.

The physical and chemical nature of the cured coatings of this invention are determined largely by the olefinic monomer or oligomers used in their formulation. A wide variety of such materials have been used to achieve the desired combination of abrasion and scratch resistance, chemical resistance, texture, flexibility and the like. In general, such olefinic compounds are mono- or polyfunctional acrylic compounds or mixtures thereof.

In one embodiment of the invention, at least a portion of the polymerizable olefinic groups are provided by polyfunctional acrylates. These polyfunctional acrylates are represented by the general formula

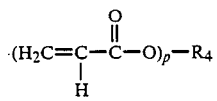

wherein p is an integer from 2 to 8, preferably from 2 to 6, and more preferably from 2 to 4, and $R_4$ is a p-valent hydrocarbon residue, a p-valent substituted hydrocarbon residue, a p-valent hydrocarbon residue containing one or more ether linkages, or a p-valent substituted hydrocarbon residue containing one or more ether linkages.

Preferred p-valent hydrocarbon residues are the p-valent aliphatic, preferably saturated aliphatic, hydrocarbon residues containing from 1 to about 20 carbon atoms and the p-valent aromatic hydrocarbon residues containing from 6 to about 10 carbon atoms.

Preferred ether-containing p-valent hydrocarbon residues are the p-valent aliphatic hydrocarbon residues, preferably saturated aliphatic hydrocarbon residues, containing from 1 to about 5 ether linkages and from 2 to about 20 carbon atoms.

Preferred p-valent substituted hydrocarbon residues are the p-valent aliphatic hydrocarbon residues, preferably the saturated aliphatic hydrocarbon residues, containing from 1 to about 20 carbon atoms, and the p-valent aromatic hydrocarbon residues containing from 6 to about 10 carbon atoms which contain substituent groups such as halogen, i.e., fluorine, chlorine, bromine and iodine, hydroxyl, carboxylic acid groups and $C_1$-$C_6$ alkyl caraboxylate groups.

Preferred ether-containing p-valent substituted hydrocarbon residues are the p-valent aliphatic, preferably saturated aliphatic, hydrocarbon residues containing from 2 to about 20 carbon atoms and from 1 to about 5 ether linkages, and which contain substituent groups such as those described in the preceding paragraph. When substituent groups are present, they should not unduly hinder or interfere with the photocure of the polyfunctional acrylic monomers.

Preferred polyfunctional acrylic monomers are those represented by formula II, wherein $R_4$ is selected from the group consisting of a p-valent saturated aliphatic hydrocarbon residue containing from 1 to about 20 carbon atoms, a hydroxyl-substituted p-valent saturated aliphatic hydrocarbon residue containing from 1 to about 20 carbon atoms, a p-valent saturated aliphatic hydrocarbon residue containing from 2 to about 20 carbon atoms and from 1 to about 5 ether linkages, and a hydroxyl-substituted p-valent saturated aliphatic hydrocarbon residue containing from 2 to about 20 carbon atoms and from 1 to about 5 ether linkages. Especially, preferred polyfunctional acrylate ester monomers are those wherein $R_4$ is a p-valent saturated aliphatic hydrocarbon, ether, or polyether radical, with those monomers wherein $R_4$ is a p-valent saturated aliphatic hydrocarbon radical being most preferred.

More particularly, the difunctional acrylic monomers, or diacrylates, are represented by formula I, wherein p is 2; the trifunctional acrylic monomers, or triacrylates, are represented by formula I, wherein p is 3; and the tetra-functional acrylic monomers, or tetraacrylates, are represented by formula I, wherein p is 4.

Illustrative of suitable polyfunctional acrylate ester monomers of formula II are those listed in columns 6 and 7 of U.S. Pat. No. 4,198,475 to Moore et al., incorporated herein by reference.

These polyacrylate esters and their production are well-known to those skilled in the art. One method of producing the di-, tri-, and tetraacrylate esters involves reacting acrylic acid with a di-, tri-, or tetrahydroxyl compound to produce the diester, triester or tetraester. Thus, for example, acrylic acid can be reacted with ethylene glycol to produce ethylene glycol diacrylate.

The coating compositions may contain only one of said polyfunctional acrylate monomers or a mixture of one or more polyfunctional acrylate monomers, optionally also containing a monofunctional acrylic monomer. Preferred coating compositions contain a mixture of two polyfunctional monomers, preferably a diacrylate and a triacrylate. When the coating compositions contain a mixture of acrylate monomers, it is preferred that the ratio, by weight, of the diacrylate to the triacrylate be from about 30/70 to about 70/30. Exemplary mixtures of diacrylates and triacrylates include mixtures of hexanediol diacrylate with pentaerythritol triacrylate, hexanediol diacrylate with trimethylolpropane triacrylate, diethyleneglycol diacrylate with pentaerythritol triacrylate, and diethyleneglycol diacrylate with trimethylolpropane triacrylate.

Mono- and polyfunctional acrylates may also be prepolymerized to form oligomers prior to incorporation into this invention. In general, such pre-polymeriation is conducted to produce liquid oligomers having a viscosity amenable to coating applications.

Generally, the coating composition contains from about 70 to about 99 weight percent of the polyfunctional acrylate or acrylates. The UV-cured coating thus contains from about 70 to about 99 weight percent of the photoreaction products of the polyfunctional acrylate monomers or mixtures of acrylate monomers present in the coating composition.

The photocurable coating compositions also contain a photosensitizing amount of photosensitizer, i.e., an amount effective to effect the photocure of the coating composition. Generally, this amount is from about 0.01% to about 10% by weight, preferably from about 0.1% to about 5% by weight of the photocurable coating composition. These additives and the cure thereof are generally well-known in the art. Some nonlimiting examples of these UV radiation photosensitizers include ketones, such as benzophenone, acetophenone, benzil, benzyl methyl ketone; benzoins and substituted benzoins such as benzoin methyl ether, a-hydroxymethylbenzoin isopropyl ether; halogen containing compounds such as alpha-bromoacetophenone, p-bromoacetophenone, alpha-chloromethylnaphthalene; and the like.

The coating compositions of the instant invention may also optionally contain various flatting agents, surface active agents, thixotropic agents, and dyes. All of these additives and the use thereof are well-known in the art. Therefore, only a limited number will be referred to, it being understood that any compounds possessing the ability to function in such a manner, i.e., as a flatting agent, surface active agent, and the like, can be used so long as they do not deleteriously affect the photocuring of the coating compositions and do not adversely affect the nonopaque character of the coating.

Various surface-active agents, including anionic, cationic and nonionic surface-active agents are well-known and are described, for example, in Kirk-Othmer Encyclopedia of Chemical Technology, Vol. 19, Interscience Publishers, New York, 1969, pp.507–593, and Encyclopedia of Polymer Science and Technology, Vol. 13, Interscience Publishers, New York, 1970, pp. 477–486.

In preparing the compositions of this invention, the components may be combined in any order. Typically, the photocurable coating compositions are first compounded by adding together the acrylic monomers or oligomers, the UV photosensitizer, the multimeric benzotriazole, and, optionally, any of the other aforementioned additives. Additionally, if so desired to reduce the viscosity of the coating formulation, an organic solvent, such as an alcohol, may optionally be incorporated into the formulation. Generally, the amount of solvent, if any, present should be such that evaporation of the solvent occurs before any deleterious effect on the substrate occurs. The various components advantageously are mixed so as to form a generally homogeneous coating composition. A thin, uniform coating of the coating solution is then applied onto the surface of the thermoplastic substrate by any of the known means such as dipping, spraying, rollcoating and the like.

The coating may be cured by UV irradiation using known techniques. Such curing is advantageously conducted in an inert, e.g., nitrogen, atmosphere, at a wavelength of from about 1800 A. to 4000 A. The lamp systems used to generate such radiation are well-known and do not form a part of this invention. By curing is meant both polymerization of the acrylic monomers and cross-linking of the polymers to form hard, nontacky coatings.

In order to more fully and clearly illustrate the present invention, the following specific examples are presented. It is intended that the examples be considered as illustrative rather than limiting the invention disclosed and claimed herein. All parts unless otherwise indicated are by weight.

EXAMPLE 1

A coating composition is made by blending together 5 parts by weight of trimethylolpropane triacrylate, 5 parts by weight hexanediol diacrylate, 0.55 parts by weight of the triethyleneglycoldiester of 3-[3-t-butyl-4-hydroxy-5-(benzotriazol-2-yl) phenyl] propionic acid, 0.5 parts by weight of alpha, alpha-diethoxyacetophenone, and 1 drop of a surface active agent produced by Mallincrodt, Inc., St. Louis, Mo. under the designation BYK-300. A film of about 0.3 mils thickness of this coating composition is applied to one side of ⅛" thick panel of polycarbonate resin manufactured by General Electric Company using a No. 6 wire-wound drawdown bar.

The coated polycarbonate panel is then passed through a nitrogen-blanketed Linde photocuring apparatus (this consists of a variable speed conveyor running through a chamber containing medium pressure mercury vapor lamps which emit light mainly at 2537A, 2652A, 2967A, 3022A, 3126A, and 3650A wherein the nitrogen pressure is 25 psi nitrogen and the speed of the conveyor is 50 ft/min.. The panel is then cured to a hard coating.

The test panels are subjected to an abrasion test and an adhesion test. The abrasion test is one wherein test panels having a ¼ inch diameter hole cut in the center are subjected to a Taber Abraser. The Taber Abraser is equipped with CS-10F wheels which are resurfaced every 100 cycles by abrading for 25 cycles on a S-111 refacing disc. The weights used in combination with the CS-10F wheels are 500 gm. weights. Initial measurements of % Haze are made at four places around the wear track of the sample using a Gardner Hazemeter. The sample is abraded for 100 cycles, cleaned with isopropanol, and the % Haze is remeasured at the same four places. The four differences in % Haze are calculated and averaged to give the Δ% Haze. The Δ% Haze of this uncoated sample is 34.

The scribed adhesion test consists of using a multiple bladed tool to cut parallel grooves through the coating into the substrate, the sample is then rotated 90° and the cutting process is repeated. This leaves a grid pattern of 1 mm squares cut into the coating. Scotch 810 Magic Transparent tape is applied over the crosshatched area and quickly pulled off. A sample fails the adhesion test if any of the squares are pulled off.

The results of the adhesion test and abrasion test are set forth in Table 1.

EXAMPLE 2

(Comparative)

This example describes an acrylic coating composition which contains a monomeric benzotriazole UV-absorber. The coating composition was made by blending together 5 parts by weight of trimethylpropane triacrylate, 5 parts by weight hexanediol diacrylate, 0.5 parts by weight of Cyasorb UV5411 (a monomeric hydroxyphenyl/benzotriazole UV absorber marketed by American Cyanamid Co.), 0.5 parts by weight of alpha, alpha-diethoxyacetophenone, and 1 drop of BYK-300. This coating was then applied to a polycarbonate panel and the panel was irradiated under mercury vapor lamps and the hard-coated panel was subjected to abrasion and adhesion tests as described in Example 1. The results of the adhesion and abrasion tests are set forth in Table 1.

TABLE 1

| Sample | Taber Abrasion % H/100 Cycles | Scribed Adhesion Test |
| --- | --- | --- |
| Example 1 | 2.8 | Pass |
| Example 2 | 2.7 | Fail |

Examples 1 and 2 and Table 1 demonstrate that the composition containing the dimeric UV absorber of the present invention shows abrasion resistance similar to and adhesion superior to the composition made with a commercial hydroxphenylbenzotriazole.

What is claimed is

1. A composition, which comprises:
   (i) a polymerizable acrylic monomer or oligomer and
   (ii) an ultraviolet radiation-absorbing effective amount of an ultraviolet radiation absorber of the formula

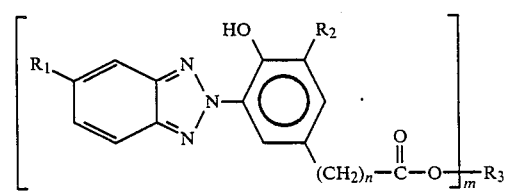

wherein $R_1$ is hydrogen, a halogen, a lower alkyl of from 1 to abut 6 carbon atoms or a lower alkoxy of from 1 to about 6 carbon atoms; $R_2$ is hydrogen, halogen, lower alkyl of from 1 to about 6 carbon atoms, or an arylsulfonyl, wherein the aryl group contains from 6 to about 10 carbon atoms; n is an integer from 1 to about 4; m is 3 and $R_3$ is a trivalent hydrocarbon radical or lower alkyl ether radical of from 2 to about 22 carbon atoms.

2. The composition of claim 1, wherein said composition contains a photoinitiator and said acrylic monomer is at least one ultraviolet light curable polyfunctional acrylate monomer represented by the general formula

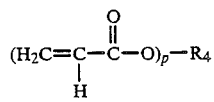

wherein p is an integer having a value of from 2 to 4, and $R_4$ is a substituted or unsubstituted p-valent aliphatic hydrocarbon residue.

3. The composition of claim 2, wherein said composition contains an amount of a photoinitiator effective to initiate the photocure of said ultraviolet light curable polyfunctional acrylate monomer upon exposure to ultraviolet light.

4. An article comprising a substrate having thereon an ultraviolet light cured thermoset coating comprised of the photoreaction products of:
   (i) at least one polyfunctional acrylate monomer represented by the general formula

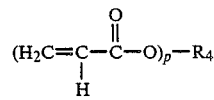

wherein p is an integer having a value of from 2 to 4, and $R_4$ is selected from the group consisting of a substituted or unsubstituted p-valent aliphatic hydrocarbon residue
   (ii) an ultraviolet radiation absorber having the general formula

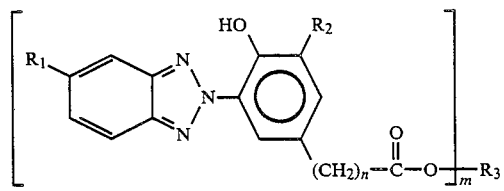

wherein $R_1$ is hydrogen, a halogen, a lower alkyl of from 1 to about 6 carbon atoms or a lower alkoxy of from 1 to about 6 carbon atoms; $R_2$ is hydrogen, halogen, lower alkyl of from 1 to about 6 carbon atoms, or an arylsulfonyl, wherein the aryl group contains from 6 to about 10 carbon atoms; n is an integer from 1 to about 4, m is 3 and $R_3$ is a trivalent hydrocarbon radical or lower alkyl ether radical of from 2 to about 22 carbon atoms.

5. The composition of claim 2, wherein said p-valent aliphatic hydrocarbon contains from 1 to about 20 carbons.

6. The composition of claim 2, wherein said p-valent aliphatic hydrocarbon residue contains from 1 to about 5 ether linkages.

7. The composition of claim 2, wherein said acrylate monomer is diethyleneglycol diacrylate.

8. The composition of claim 2, wherein said coating composition contains a mixture of hexanediol diacrylate and trimethylolpropane triacrylate.

9. The composition of claim 2, wherein said coating composition contains a mixture of hexanediol diacrylate and pentaerythritol triacrylate.

10. The composition of claim 2, wherein said coating composition contains a mixture of diethyleneglycol diacrylate and pentaerythritol triacrylate.

11. The composition of claims 2, 4 or 5 wherein $R_3$ is $-CH_2CH_2-(OCH_2CH_2-)_y$ or $-(CH_2)_6-$, wherein y is an integer from 2 to about 4, or a mixture thereof.

12. The composition of claims 2, 4 or 5 wherein $R_2$ is tert-butyl.

13. A thermoplastic article coated with the composition of claims 2 or 5, wherein the composition contains an ultraviolet light-absorbing effective amount of said ultraviolet radiation absorber.

14. A polycarbonate article coated with the composition of claims 2 or 5.

15. The article of claim 14, which is a lens for a vehicular headlamp.

16. A process for coating a thermoplastics substrate with an ultraviolet radiation-absorbing coating, comprising:
   (i) applying a thin layer of a coating composition onto the surface of said solid substrate, said coating composition containing (a) at least one polyfunctional acrylate monomer represented by the general formula

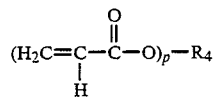

wherein p is an integer having a value of from 2 to 4, and $R_4$ is selected from the group consisting of a substituted or unsubstituted p- valent aliphatic hydrocarbon residue, (b) a photoinitiator, and (c) an ultraviolet radiation absorber having the general formula

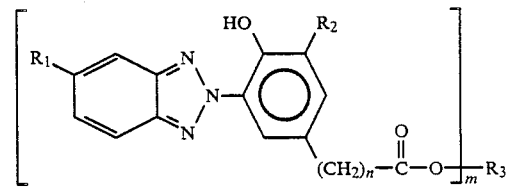

wherein $R_1$ is hydrogen, a halogen, a lower alkyl of from 1 to about 6 carbon atoms or a lower alkoxy of from 1 to about 6 carbon atoms; $R_2$ is hydrogen, halogen, lower alkyl of from 1 to about 6 carbon atoms, or an arylsulfonyl, wherein the aryl group contains from 6 to about 10 carbon atoms; n is an integer from 1 to about 4, m is 3 and $R_3$ is a trivalent hydrocarbon radical or lower alkyl ether radical of from 2 to about 10 carbon atoms; and
   (ii) exposing said coated substrate to polymerizing radiation under polymerizing conditions for a period of time sufficient to polymerized and crosslink said polyfunctional acrylate monomers, thereby forming said coating.

17. The process of claim 16, wherein said polymerizing conditions include an inert atmosphere.

18. The process of claim 16, wherein $R_4$ is a p-valent saturated aliphatic hydrocarbon residue or a p-valent substituted saturated alphatic hydrocarbon residue.

19. The process of claim 16, wherein $R_4$ is p-valent hydroxyl-substituted saturated aliphatic hydrocarbon residue.

20. The process of claim 16, wherein $R_4$ is a p-valent saturated aliphatic hydrocarbon residue containing from 1 to 5 ether linkages.

21. The process of claim 16, wherein said thermoplastic substrate is a polycarbonate or a polyestercarbonate.

22. The article of claim 4 wherein said substrate comprises a resin selected from the group consisting of aromatic polycarbonates and polyestercarbonates.

* * * * *